Oct. 14, 1947.   T. L. FAWICK   2,428,932
COMPOSITE BUSHING
Filed Jan. 24, 1945

INVENTOR.
THOMAS L. FAWICK
BY Willard D. Eakin
Attorney

Patented Oct. 14, 1947

2,428,932

UNITED STATES PATENT OFFICE 2,428,932

COMPOSITE BUSHING

Thomas L. Fawick, Akron, Ohio

Application January 24, 1945, Serial No. 574,430

3 Claims. (Cl. 287—85)

This invention relates to composite bushings comprising rubber or rubber-like material, such as are used, for example, in spring-shackles for automobiles, to connect two members having relative angular movement about the axis of the bushing, such movement being permitted by deformation of the rubber or the like, without surface friction. Another example is the use of a bushing comprising a layer of rubber or the like to provide a cushioning seat for a bearing.

Heretofore the use of such bushings in places where they come in contact with oil or grease has been unsatisfactory because if natural rubber is used for the resiliently deformable layer it is quickly damaged by the oil or grease, and if a rubber-like synthetic material is used it soon loses its tightness of fit, being subject to "cold flow," and this makes the so-called synthetic rubbers especially unsatisfactory in the many cases in which it is desirable or essential that the resilient layer be mounted under high radial compression for the sustension of high loads without excessive further deformation.

My chief objects are to overcome these difficulties, and, more specifically, to provide a bushing adapted to have a long life of strong resilience even though it be used in the presence of oil, grease or other substance that is harmful to natural rubber. Further objects are simplicity and economy of manufacture and ease of application.

Of the accompanying drawings.

Figure 1:
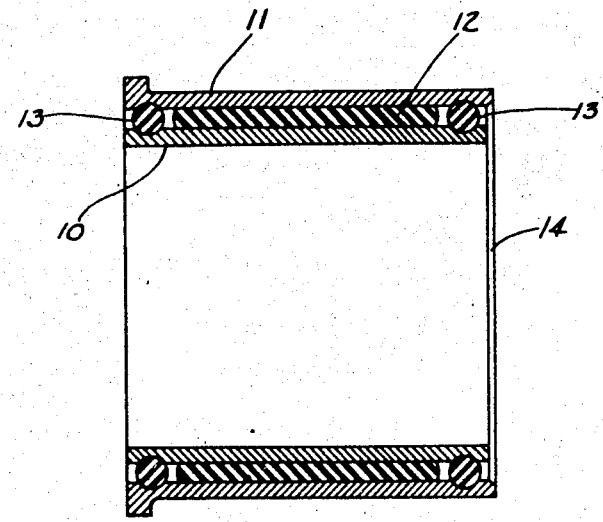
Fig. 1 is an axial section of a composite bushing embodying my invention in its preferred form.

Referring to the drawing, I attain the above stated objects, in a convenient and economical manner, by providing, preferably as a preassembled unit, a composite bushing comprising an inner metal member 10, which can be annular, as shown, but is not necessarily so; an outer metal shell member 11; between the two, but of less length, a layer of natural rubber 12; and, at or near each end of the rubber member 12, a sealing ring 13 embraced between, and preferably set in shallow grooves formed in, the two metal members, as shown in Fig. 1.

The sealing rings 13 preferably are of Neoprene or other oil-resistant synthetic "rubber," but can be of other protective material. Preferably they are spaced a little away from the respective ends of the natural rubber layer, as shown, so that its deformation does not exert any thrust upon them and so that oil is not drawn to it immediately or in large quantity by capillary attraction in case the sealing ring eventually loses some of its tightness of fit by reason of "cold flow."

Each of the sealing rings 13 is made of such cross-sectional size as to be under substantial radial compression when in place. The grooves, preferably, are arcuate in cross-section and the ring circular in cross-section, for ease of assembly and for continued snugness of fit throughout the contacting surfaces in spite of lessening of radial compression by "cold flow."

Preferably the natural rubber member 12 is put under high radial compression by first vulcanizing it to the inner metal member and then reducing its radial dimension by forcing them both into the outer metal member 11, in a manner well known in the art, after which the sealing rings are forced in between the two metal members, and into the grooves of the latter, from the respective ends of the assembly. This can be facilitated by beveling one or more of the annular metal corners, as at 14. Also, the sealing rings can be coated with an adhesive adapted to serve as a lubricant as the rings are forced into place between the metal members.

The adhesive is then permitted to set and thus provide a surface bond between the rings and the metal members. Rawhide rings, which can be well bonded in that manner, can be used in assemblies wherein the two metal members do not have much relative circumferential movement.

Figure 2:
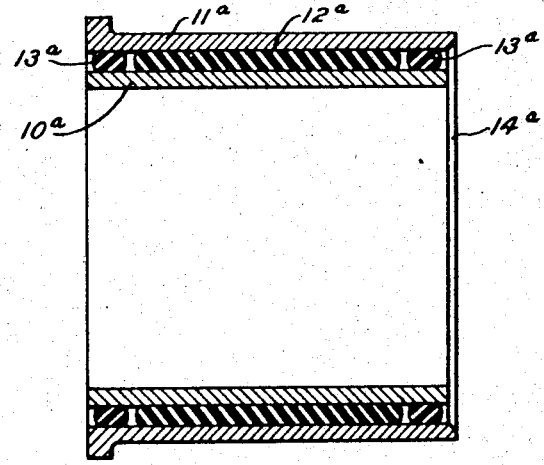
Fig. 2 is a similar section showing an alternative type of assembly.

Fig. 2 corresponds to Fig. 1, with corresponding elements designated by the same reference numerals with the added exponent $a$, except that the inner face of the outer metal member 11$a$, and the outer face of the inner metal member 10$a$, are wholly cylindrical in their portions which embrace the oil-excluding rings, 13$a$, 13$a$.

Various other modificaitons are possible within the scope of the invention as defined by the appended claims.

I claim:

1. The combination of an inner rigid member formed with a generally cylindrical outer face, an outer rigid member surrounding said inner member and formed with a generally cylindrical inner face which with the said outer face of the inner member defines an annular space, a natural-rubber bushing so mounted in said space as to resist relative movement of said members but at each end terminating short of the adjacent end of said space and, in said space, beyond each end of the natural-rubber bushing, and between generally cylindrical portions of said faces, a ring of oil-resistant synthetic material having substantially the resilient deformability of vulcanized soft-rubber, the ring being held under radial compression wholly by the said faces.

2. The combination of inner and outer rigid members defining an annular space between them and, mounted in said space radially between said rigid members, a natural-rubber bushing which at each end terminates short of the adjacent end of said space, and, in said space, radially between said rigid members and beyond each end of the natural-rubber bushing, a ring of resilient, oil-resistant material held under radial compression by its contact with the radially outer face of the said inner rigid member and the radially inner face of said outer rigid member.

3. A combination as defined in claim 2 in which at least one of the rings of oil-resistant material is seated in an annular groove formed in one of the two defined rigid members.

THOMAS L. FAWICK.

REFERENCES CITED

The following references are of record in the file of this patent:

UNITED STATES PATENTS

| Number | Name | Date |
|---|---|---|
| 2,282,239 | Opsahl | May 5, 1942 |
| 83,899 | Allison | Nov. 10, 1868 |
| 837,482 | Libert | Dec. 4, 1906 |
| 1,942,489 | Pfefferle | Jan. 9, 1934 |
| 2,294,452 | Guy | Sept. 1, 1942 |
| 1,958,119 | Tarr | May 8, 1934 |